(12) United States Patent
Setono et al.

(10) Patent No.: US 9,829,579 B2
(45) Date of Patent: Nov. 28, 2017

(54) ELECTRONIC APPARATUS AND METHOD FOR MEASURING DIRECTION OF OUTPUT LASER LIGHT

(71) Applicant: Funai Electric Co., Ltd., Osaka (JP)

(72) Inventors: Shingo Setono, Ikoma (JP); Ryusuke Horibe, Hirakata (JP); Manabu Murayama, Itami (JP); Yuichiro Masuda, Takatsuki (JP); Tomohisa Hirai, Osaka (JP); Atsushi Mushimoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 348 days.

(21) Appl. No.: 14/743,438

(22) Filed: Jun. 18, 2015

(65) Prior Publication Data

US 2015/0369920 A1 Dec. 24, 2015

(30) Foreign Application Priority Data

Jun. 20, 2014 (JP) ................. 2014-127339

(51) Int. Cl.
| | | |
|---|---|---|
| *G01S 17/42* | (2006.01) | |
| *G01S 7/481* | (2006.01) | |
| *G01S 7/497* | (2006.01) | |
| *G02B 26/08* | (2006.01) | |
| *G02B 26/10* | (2006.01) | |
| *G02B 26/12* | (2006.01) | |

(52) U.S. Cl.
CPC ............ *G01S 17/42* (2013.01); *G01S 7/4817* (2013.01); *G01S 7/4972* (2013.01); *G02B 26/0833* (2013.01); *G02B 26/101* (2013.01); *G02B 26/127* (2013.01)

(58) Field of Classification Search
CPC ...... G01S 17/42; G01S 7/4972; G01S 7/4817; G02B 26/0833; G02B 26/101; G02B 26/127
See application file for complete search history.

(56) References Cited

U.S. PATENT DOCUMENTS

| | | | |
|---|---|---|---|
| 8,368,876 B1* | 2/2013 | Johnson .................. G01S 7/497 356/3.01 |
| 8,446,571 B2* | 5/2013 | Fiess ....................... G01S 17/42 356/3.01 |
| 8,688,308 B2* | 4/2014 | Wu ....................... G05D 1/0236 701/28 |
| 2006/0071578 A1* | 4/2006 | Drabe ................ G01C 19/5642 310/309 |
| 2009/0284190 A1* | 11/2009 | Matsubara ........... G02B 26/085 318/114 |
| 2014/0218715 A1* | 8/2014 | Li ......................... G01S 7/4813 356/4.01 |

FOREIGN PATENT DOCUMENTS

| | | | |
|---|---|---|---|
| JP | 2005-077288 A | | 3/2005 |
| JP | 2012078269 | * | 4/2012 |

* cited by examiner

*Primary Examiner* — Eric Bolda
(74) *Attorney, Agent, or Firm* — Osha Liang LLP

(57) ABSTRACT

An electronic apparatus includes a light source that outputs a laser light; a scanning unit that scans the laser light; a reflective member having a reflective surface that reflects the laser light; a light-receiving unit that receives a first reflected light reflected by the reflective member; and a signal processing unit that calculates a distance from the light source to the reflective surface using the first reflected light and determines a direction in which the laser light is output using the distance.

20 Claims, 18 Drawing Sheets

ELECTRONIC APPARATUS AND METHOD FOR MEASURING DIRECTION OF OUTPUT LASER LIGHT

TECHNICAL FIELD

The present invention relates generally to an electronic apparatus (e.g., a laser range finder).

BACKGROUND

As a sensor for sensing an obstacle when a robot is autonomously moving or a sensor for sensing a person, there is, for example, a laser range finder (LRF).

Conventional laser range finders perform measurement of a time from when a laser light is output to when a reflected light, which is the laser light striking an object and being reflected, returns and calculates a distance to the object from a measurement result. The laser range finders, by changing a direction in which the laser light is output in a horizontal direction and a vertical direction, perform measurement of the distance to the object in an entirety of a range where measurement of the distance is performed (referred to hereinbelow as "scanning range").

The conventional laser range finders comprise, for example, a laser diode (LD) that outputs the laser light, a mirror that adjusts an output direction of the laser light, a light-receiving element that receives the reflected light from the object, and a signal processing unit. As the minor that adjusts the output direction of the laser light, there is, for example, a mirror installed to a rotation mechanism, a polygon minor, a MEMS (Micro Electro Mechanical System) mirror, and the like. The signal processing unit outputs an output signal that causes the laser diode to output the laser light and accepts a light-receiving signal from the light-receiving element. The signal processing unit measures the distance to the object from a difference between a phase of the laser light output from the laser light and a phase of the reflected light received by the light-receiving element.

To precisely perform measurement of the distance by the conventional laser range finders, more accurately seeking an angle in the horizontal direction and an angle in the vertical direction of when the object is detected is desired.

As a method of seeking the angle in the vertical direction, there is disclosed, for example, a method that adds a light-receiving element to each end portion of a scanning range in a vertical direction and seeks a range of an amplitude from a timing at which the light-receiving elements detect a laser light (for example, see Patent Literature 1).

CITATION LIST

Patent Literature

[Patent Literature 1] Japanese Unexamined Patent Application Publication No. 2005-77288

However, in the method described in Patent Literature 1, because a plurality of light-receiving elements needs to be provided, manufacturing costs increase.

SUMMARY OF THE INVENTION

A laser range finder according to one or more embodiments can more accurately seek a direction in which a laser light is output while suppressing manufacturing costs from increasing.

In one aspect, a laser range finder according to one or more embodiments of the present invention may comprise: a light source that outputs a laser light; a scanning unit that changes a direction in which the laser light is output; a reflective member having a reflective surface where a distance of an optical path from the light source to a position to which the laser light is irradiated changes according to the direction in which the laser light is output; a light-receiving unit that receives a first reflected light that is the laser light reflected by the reflective member; and a signal processing unit that calculates a distance from the light source to the reflective surface using the first reflected light received by the light-receiving unit and calculates the direction in which the laser light is output using this distance.

According to one or more embodiments, the laser range finder of the above configuration may comprise the reflective member having the reflective surface where the distance of the optical path from the light source (distance from the scanning unit) changes according to the direction in which the laser light is output. Therefore, for example, the direction in which the laser light is output can be sought by measuring the distance of the optical path between the light source and the reflective surface. Moreover, a calculation method of the distance of the optical path between the light source and the reflective surface is the same as that of a distance of an optical path between the light source and an object. Therefore, for example, a device configuration can be simplified.

According to one or more embodiments, the laser range finder of the above configuration includes a reflective member that is inexpensive compared to a light-receiving element and the like. As a result, for example, manufacturing costs can be suppressed from increasing.

According to one or more embodiments, for example, the scanning unit may be oriented to be on the optical path of the laser light, and the reflective surface may be a rectangular plane and may be disposed so a distance from the scanning unit to one short side of the rectangle is smaller than a distance from the scanning unit to the other short side of the rectangle.

According to one or more embodiments, with the laser range finder of the above configuration, the reflective surface may be rectangular. Therefore, for example, a shape of the reflective member can be made to be a simple shape.

According to one or more embodiments, the reflective member may be disposed to cause a line connecting the scanning unit and an end portion of the reflective member to parallel a long side of the reflective surface.

The laser range finder of the above configuration may be disposed to cause the line connecting the scanning unit and the end portion of the reflective member to parallel the long side of the reflective surface. Therefore, for example, it may be possible to make the laser light straddle the reflective surface substantially the same across every angle in a first direction. Thus, it may be possible to favorably perform calculation of an angle in a second direction.

According to one or more embodiments, the reflective member may be disposed more on an inner side than a line connecting the scanning unit and an opening portion of the casing.

With the laser range finder of the above configuration, the reflective member is disposed more on the inner side than the line connecting the scanning unit and the opening portion of the casing. Therefore, for example, it may be possible to suppress an influence of outside light.

According to one or more embodiments, the scanning unit may change the direction in which the laser light is output to a first direction and a second direction that intersects the first direction, and in a state where an angle in the first direction is maintained, change an angle in the second direction, and, afterward, by changing the angle in the second direction, two-dimensionally change the direction in which the laser light is output. The light-receiving unit may further receive a second reflected light, which is the laser light reflected by an object, and the signal processing unit, in a state where an angle in the second direction of when the light-receiving unit receives the second reflected light is maintained, calculate a distance from the light source to the reflective member using the first reflected light and, using this distance, calculate an angle in the first direction of when the first reflected light is received as an angle of the laser light in the first direction of when the second reflected light is received.

With the laser range finder of the above configuration, in the state where the angle in the first direction is maintained, the direction in which the laser light is output is changed to the second direction. Therefore, for example, it may be possible for the light-receiving unit to receive the first reflected light from the reflective member in a state where an angle in the first direction of when the object is detected is maintained. That is, an angle in the first direction from the first reflected light the light-receiving unit detects in the state where the angle in the first direction of when the object is detected is maintained is the same as the angle in the first direction of when the object is detected. Therefore, for example, the laser range finder of the above configuration can seek the angle in the first direction of when the object is detected by seeking the angle in the first direction from the first reflected light detected by the light-receiving unit.

According to one or more embodiments, the signal processing unit may calculate the distance based on a phase difference between a phase of the laser light and a phase of the light received by the light-receiving unit.

According to one or more embodiments, the signal processing unit may calculate an angle in the horizontal direction of when the object is detected using a timing at which the light-receiving unit receives the first reflected light and a time when the object is detected, the signal processing unit may acquire a timing at which the object is detected, detect an interval between the timing at which the light-receiving unit receives the first reflected light and a time when the laser light passes through the reflective member, calculate a sine wave indicating displacements in a direction of the laser light relative to time using this interval and a direction in which the reflective member is disposed, and calculate the direction of the laser light using the sine wave and the timing at which the object is detected.

With the laser range finder of the above configuration, for example, it may be possible to precisely calculate the angle in the second direction.

An electronic apparatus according to one or more embodiments may comprise a light source that outputs a laser light; a scanning unit that scans the laser light; a reflective member having a reflective surface that reflects the laser light; a light-receiving unit that receives a first reflected light reflected by the reflective member; and a signal processing unit that calculates a distance from the light source to the reflective surface using the first reflected light and determines a direction in which the laser light is output using this distance.

A method according to one or more embodiments may comprise scanning a laser light output by a light source; reflecting, with a reflective surface of a reflective member, the laser light; calculating a distance from the light source to the reflective surface using the reflected light; and determining, based on the calculated distance, a direction in which the laser light is output.

Embodiments of the present invention cause the direction in which the laser light is output to be more accurately sought while suppressing the manufacturing costs from increasing.

DETAILED DESCRIPTION OF EMBODIMENTS

Embodiments according to the present invention will be described in detail below using the drawings. Each drawing does not necessarily strictly illustrate each dimension, each dimension ratio, and the like.

Numerical values, shapes, materials, components, disposition positions and connection modes of the components, steps, orders of the steps, and the like illustrated in the one or more embodiments of the present invention below are but examples and are not intended to limit the present invention.

(An Example)

A laser range finder of one or more embodiments of an example will be described based on FIGS. 1 to 17.

(1. Configuration of Laser Range Finder According to One or More Embodiments)

Figure 1:
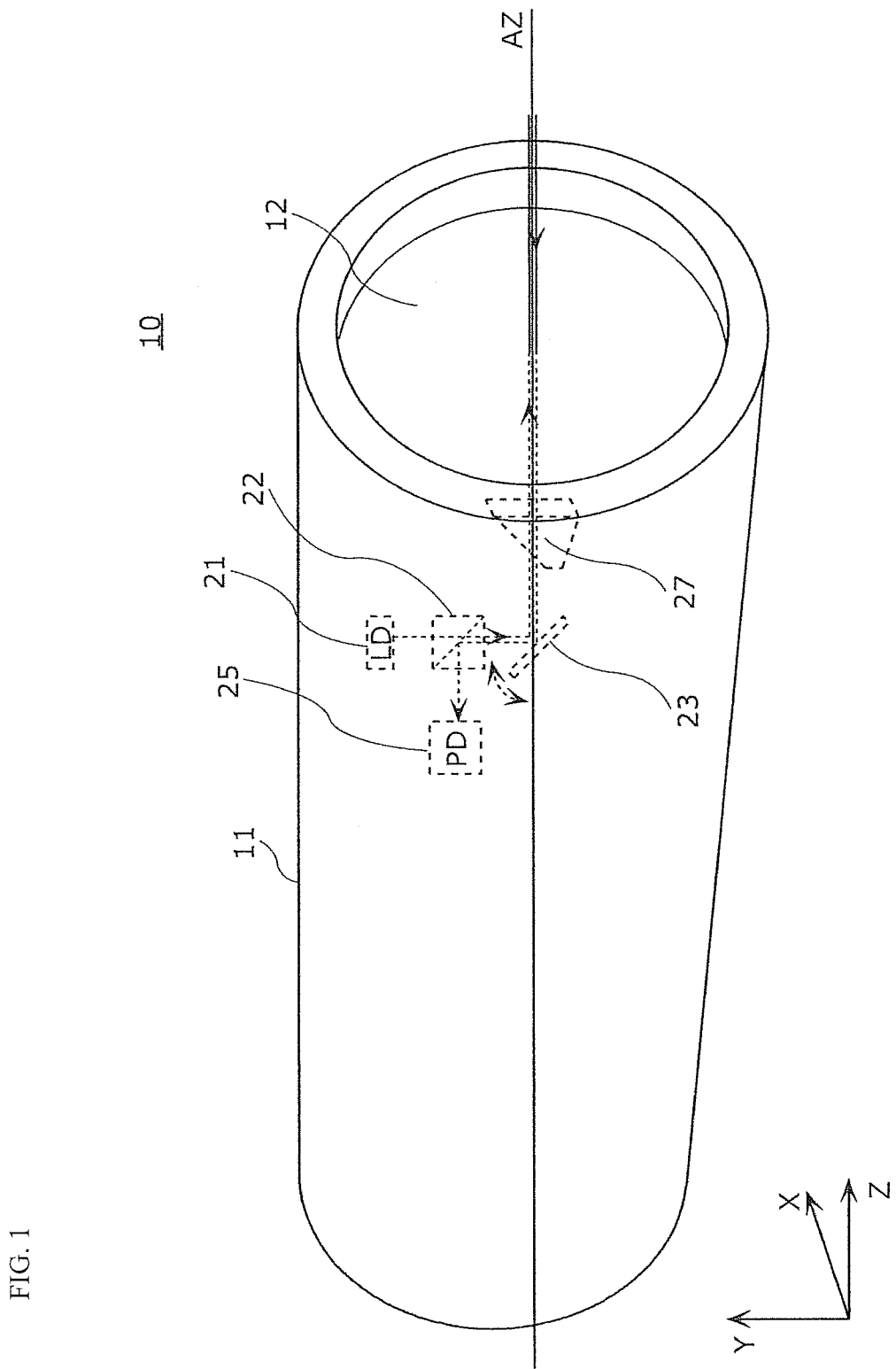
FIG. 1 shows a perspective view illustrating a configuration of a laser range finder according to one or more embodiments of an example of the present invention.

FIG. 1 is a perspective view illustrating a configuration of a laser range finder 10 according to one or more embodiments of the example of the present invention. In FIG. 1, the z-axis is an axis parallel to an axis AZ of the laser range finder (reference direction) and the x-axis and the y-axis are axes parallel to an object lens 12 and an eyepiece lens (not illustrated). The laser range finder 10 is an example of an electronic apparatus. The laser range finder 10 may be also called a distance measurement device.

One or more embodiments of the example will be described with a monocular laser range finder 10 as an example but is not limited thereto. A lens through which a laser light output to an object is output and a lens that receives a reflected light from the object may be configured separately.

Figure 2:
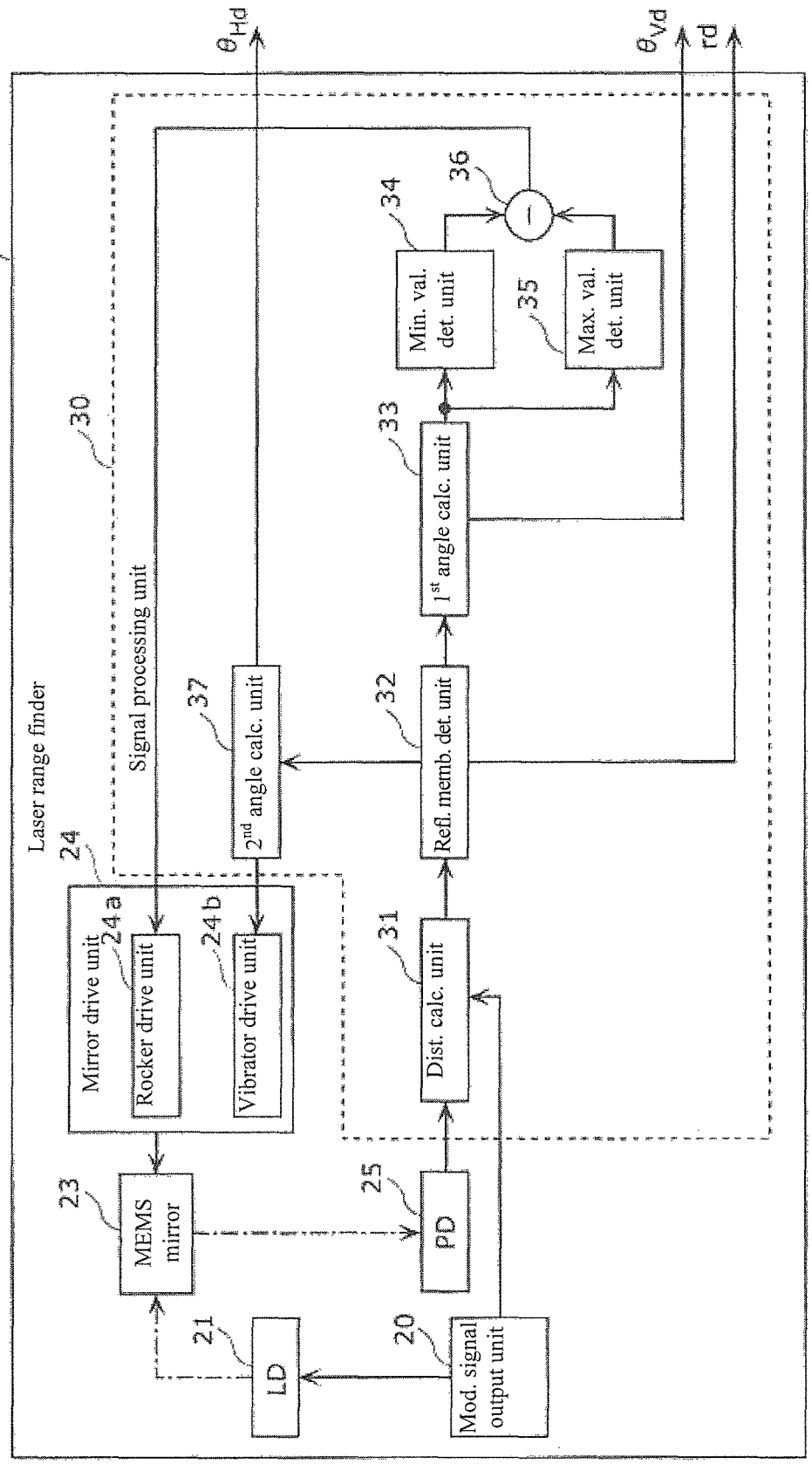
FIG. 2 shows a block diagram illustrating the configuration of the laser range finder according to one or more embodiments of an example of the present invention.

FIG. 2 is a block diagram illustrating the example of the configuration of the laser range finder 10 in one or more embodiments of the example. In FIG. 2, a path of an electrical signal is illustrated by the arrows of the solid line, and a path of the light is illustrated by the arrows of the one-dot chain line.

Figure 3:
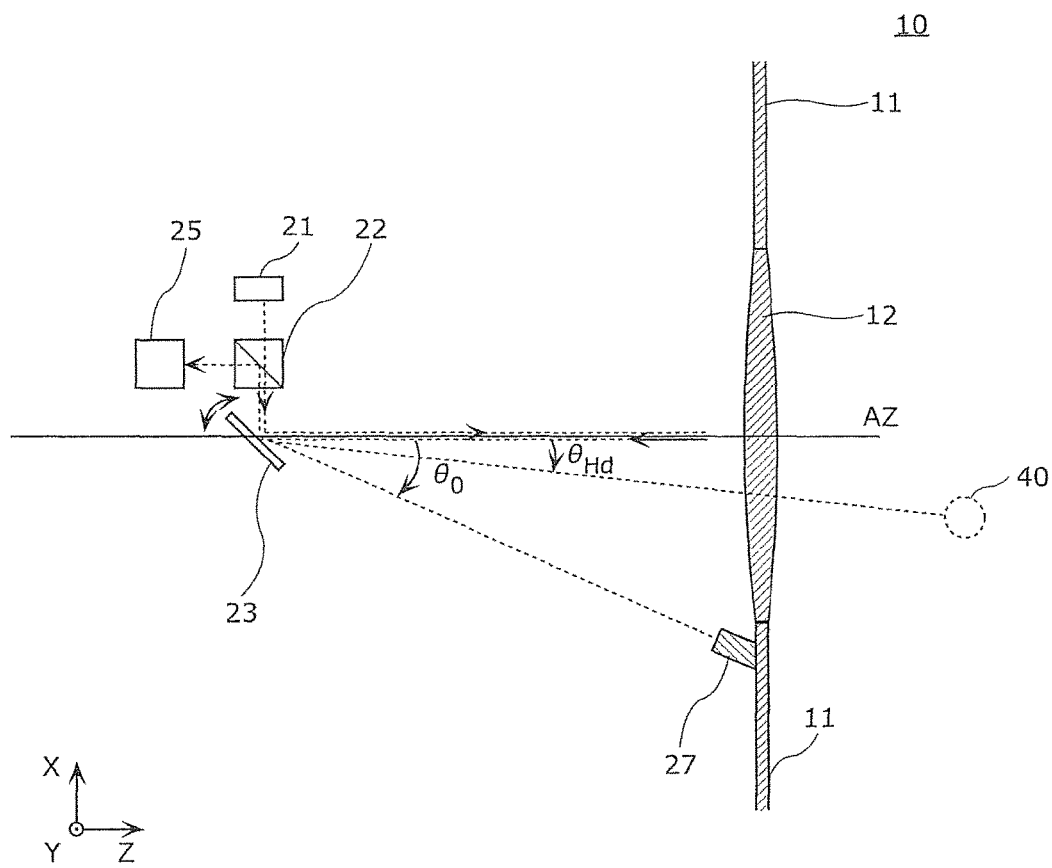
FIG. 3 shows a view illustrating positional relationships between each configuration of the laser range finder according to one or more embodiments of an example of the present invention.

FIG. 3 is a view illustrating an example of positional relationships between a laser diode 21, a perforated minor 22, a MEMS minor 23, a light-receiving unit 25, and a reflective member 27 of the laser range finder 10 in one or more embodiments of the example. In FIG. 3, the axis A1 is an axis parallel to the xz-plane and is an axis that passes through the MEMS mirror 23 and the reflective member 27.

As illustrated in FIGS. 1 to 3, the laser range finder 10 comprises a tubular casing 11; the eyepiece lens (not illustrated), which is disposed in a circular opening portion formed in a bottom surface; and the object lens 12, which is disposed in a circular opening portion formed in an upper surface.

Furthermore, the laser range finder 10 comprises, inside the casing 11, a modulated signal output unit 20, the laser diode 21, the perforated mirror 22, the MEMS mirror 23, a mirror drive unit 24, the light-receiving unit 25, and a signal processing unit 30.

(1-1. Modulated Signal Output Unit, Laser Diode, and Perforated Mirror)

The modulated signal output unit 20 generates a modulated signal for causing the laser diode 21 to output the laser light.

The laser diode 21 is an example of a light source that outputs the laser light, and it outputs the laser light according to the modulated signal output from the modulated signal output unit 20. The laser diode 21 is disposed inside the casing 11 and outputs the laser light toward the MEMS mirror 23.

The laser light output from the laser diode 21 passes through holes of the perforated mirror 22 and is reflected at the MEMS mirror 23. The laser light, after being reflected at the MEMS mirror 23, is output toward the outside from the object lens 12 provided in an opening portion of the casing 11 of the laser range finder 10. Alternatively, the laser light, after being reflected at the MEMS mirror 23, is reflected by the reflective member 27 provided in the casing 11 of the laser range finder 10.

A first reflected light, which is the laser light reflected by an object 40, is condensed in the object lens 12 provided in the opening portion of the casing 11. The first reflected light condensed by the object lens 12 is reflected toward the perforated mirror 22 at the MEMS mirror 23. The first reflected light is further reflected toward the light-receiving unit 25 at the perforated mirror 22. Moreover, a second reflected light reflected by the reflective member 27 is reflected toward the perforated mirror 22 at the MEMS minor 23. The first reflected light and the second reflected light reflected by the perforated minor 22 are received by the light-receiving unit 25.

As illustrated in FIG. 3, the perforated mirror 22 is a member that lets the laser light output from the laser diode 21 pass through as-is and reflects the light from the MEMS minor 23 (the first reflected light from the object 40 and the second reflected light from the reflective member 27). The perforated minor 22 is disposed on an optical path of the laser light between the laser diode 21 and the MEMS minor 23.

For example, the perforated mirror 22 includes a plate-like member having a reflective surface that reflects the light from the MEMS mirror 23 toward the light-receiving unit 25. In this plate-like member, a hole is formed that lets the laser light output from the laser diode 21 pass through as-is. Because the laser light that passes through the perforated mirror 22 is a focused light, it is possible to form a surface area of a cross section of the hole to be extremely small. Due to the reflected light from the object 40 being weak in intensity compared to the laser light, to secure a surface area of the reflective surface, a cross-sectional area of the hole small may be made.

(1-2. MEMS Minor and Minor Drive Unit)

The MEMS (Micro Electro Mechanical System) mirror 23 is an example of a scanning unit that scans the laser light output from the laser diode 21. The MEMS minor 23 changes a direction in which the laser light output from the laser diode 21 is output. The MEMS minor 23 is configured forming a minor that is a microscopic mechanical component on a silicon substrate forming an electronic circuit.

Figures 4A, 4B:
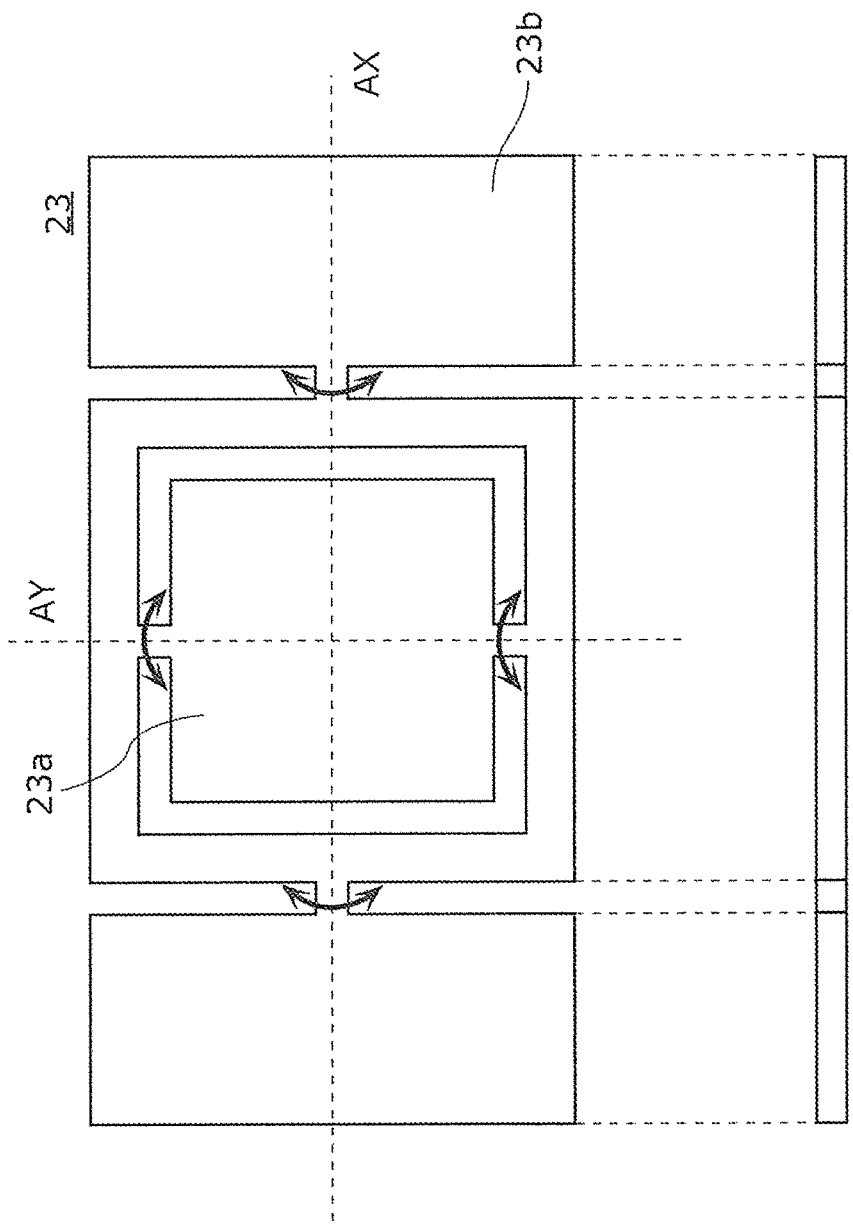
FIGS. 4a and 4b show a view in an xy-plane and a view in an xz-plane respectively illustrating a configuration of a MEMS minor according to one or more embodiments of an example of the present invention.

FIGS. 4a and 4b are a view in an xy-plane and a view in an xz-plane respectively illustrating an example of the configuration of the MEMS mirror 23 according to one or more embodiments of the example.

For the sake of description, the x-axis direction is described as a horizontal direction and the y-axis direction is described as a vertical direction, but these directions are directions of when the laser range finder 10 is used in an ideal posture, and the x-axis direction does not necessarily need to be parallel to the horizontal direction. Similarly, the y-axis direction does not necessarily need to be parallel to the vertical direction.

As illustrated in FIG. 4a, the MEMS mirror 23 includes a mirror portion 23a and a mirror rocker 23b.

The mirror portion 23a has a reflective surface that reflects the laser light output from the laser diode 21 and has a mechanism that rocks the reflective surface in the x-axis direction around an axis AY passing through a central portion of the mirror portion 23a. The mirror portion 23a is horizontally driven by a resonant frequency by a voltage supplied from the mirror drive unit 24. By this, the MEMS mirror 23 can horizontally scan at a high speed.

The mirror rocker 23b, by rocking an entirety of the mirror portion 23a around an axis AX orthogonal to the axis AY, drives the mirror unit 23a in the y-axis direction. The mirror rocker 23b vertically drives the mirror portion 23a by one line each time the mirror portion 23a rocks once in the x-axis direction. That is, vertical driving by the mirror rocker 23b is low-speed compared to horizontal driving in the mirror portion 23a.

A scanning range of the MEMS mirror 23 in the x-axis direction and the y-axis direction is designed to be slightly greater than a size of the opening portion formed in the upper surface of the casing 11.

The mirror drive unit 24 includes a rocker drive unit 24a and a vibrator drive unit 24b.

The rocker drive unit 24a generates a vertical drive current for vertically driving the mirror rocker 23b and outputs this to the mirror rocker 23b. Moreover, the rocker drive unit 24a accepts a width of the scanning range in the y-axis direction from a subtraction unit 36 of the signal processing unit 30 that will be described below and adjusts an amplitude of the vertical drive current according to this width.

The vibrator drive unit 24b generates a horizontal drive current for horizontally driving the mirror portion 23a and outputs this to the mirror portion 23a. Moreover, the vibrator drive unit 24b accepts an angle in the x-axis direction of when the object 40 is detected from a second angle calculation unit 37 of the signal processing unit 30 that will be described below and adjusts an amplitude of the horizontal drive current according to this angle in the x-axis direction.

Figure 5:
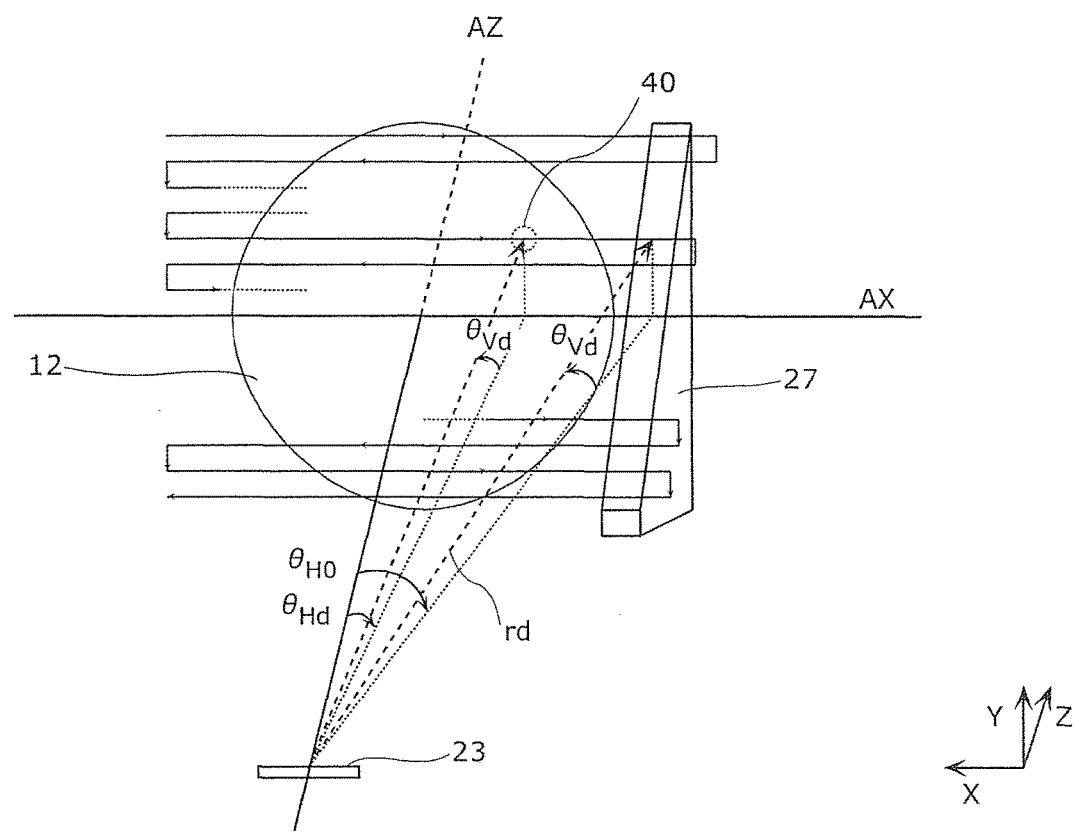
FIG. 5 shows a view illustrating changes in a direction of a laser light according to one or more embodiments of an example of the present invention.
Figure 6:
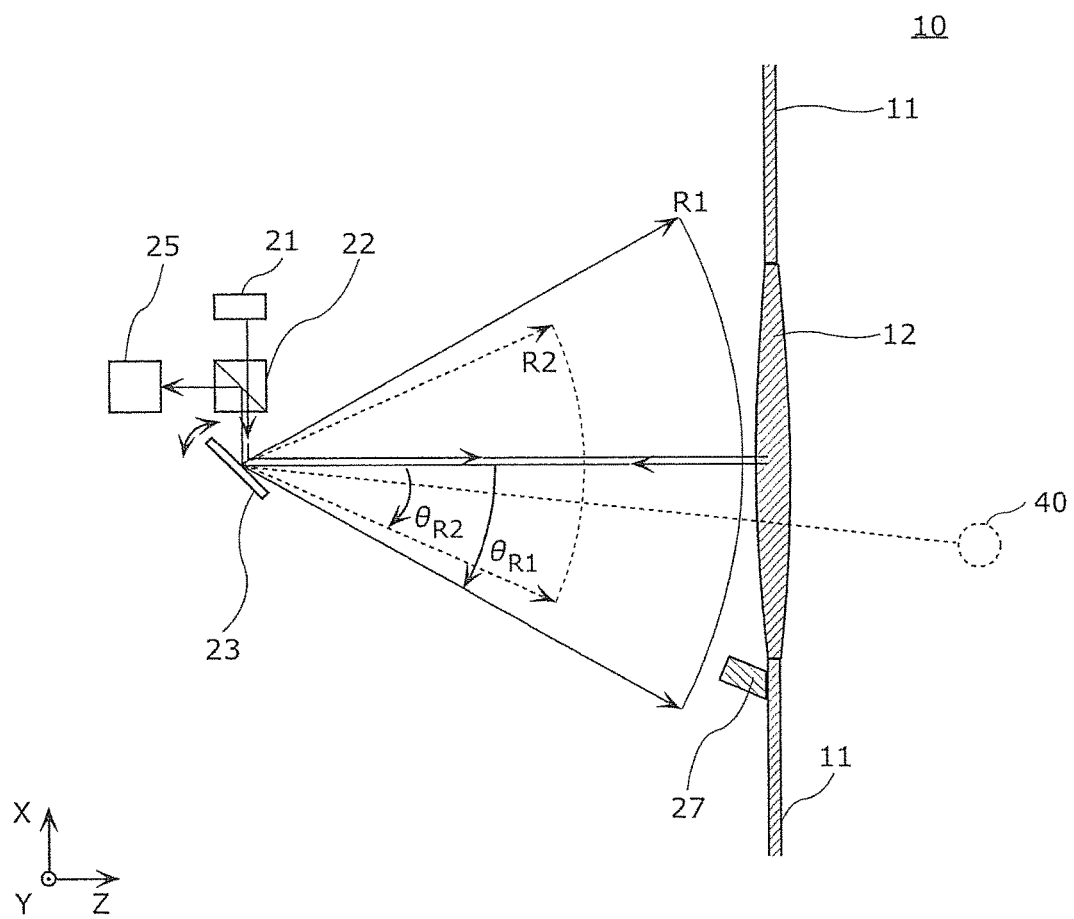
FIG. 6 shows a view illustrating changes of the laser light in an x-axis direction according to one or more embodiments of an example of the present invention.

FIG. 5 is a view illustrating changes in the direction of the laser light according to one or more embodiments of the example. FIG. 6 is a view illustrating changes of the laser light in the x-axis direction according to one or more embodiments of the example. In the description below, a range in which the laser light is output is referred to as the scanning range. The scanning range in the x-axis direction is $+\theta_{Hn}$ to $-\theta_{Hn}$, and the scanning range in the y-axis direction is $+\theta_{Vn}$ to $-\theta_{Vn}$.

As illustrated in FIG. 5, the MEMS mirror 23 changes the direction in which the laser light is scanned to the y-axis direction (an example of a second scanning direction) and the x-axis direction (an example of a first scanning direction), which intersects the y-axis direction. The MEMS mirror 23 scans the laser light in the x-axis direction in a state where an angle in the y-axis direction is maintained. A range of change of the angle in the x-axis direction becomes, for example, like a scanning range R1 or R2 illustrated in FIG. 6, a range that straddles the opening portion of the casing 11. The scanning range changes due to a temperature change, aging deterioration, or the like. The MEMS mirror 23 thereafter changes the angle in the y-axis direction by one line in a state where the angle in the x-axis direction ($+\theta_{Hn}$ or $-\theta_{Hn}$) is maintained By repeating similar operations, the MEMS mirror 23 two-dimensionally changes the direction in which the laser light is scanned.

The scanning range in the x-axis direction changes due to a temperature change, aging deterioration, or the like. That is, as illustrated in FIG. 6, $\theta_{Hn}$ changes between $\theta_{R1}$ and $\theta_{R2}$.

For example, as illustrated in FIGS. 3, 5, and 6, in a state where the angle $+\theta_{Vn}$ in the y-axis direction is maintained, the angle in the x-axis direction is changed from $-\theta_{Hn}$ ($=-\theta_{R1}$ or $-\theta_{R2}$) to $+\theta_{Hn}$ ($=+\theta_{R1}$ or $\theta_{R2}$). Afterward, in the state where the angle in the x-axis direction is maintained, the angle in the y-axis direction is changed by one line. Moreover, in a state where an angle $+\theta_{V(n-1)}$ in the y-axis direction is maintained, the angle in the x-axis direction is changed from $+\theta_{Hn}$ to $-\theta_{Hn}$. By repeating similar controls until the angle in the y-axis direction becomes $-\theta_{Vn}$, the direction in which the laser light is scanned is changed two-dimensionally. As shown in FIGS. 3 and 5, an angle of the object 40 in the x-axis direction is defined as $\theta_{Hd}$, and an angle of the object 40 in the y-axis direction is defined as $\theta_{Vd}$. Moreover, an angle of the reflective member 27 in the x-axis direction is defined as $\theta_{H0}$.

(1-3. Light-Receiving Unit)

The light-receiving unit 25 includes a light-receiving element that receives the light from the perforated mirror 22. The light-receiving element is provided with a light-receiving surface configured by a glass surface. The light-receiving unit 25 receives the second reflected light, which is the laser light reflected by the object 40 and modulated, and the first reflected light, which is the laser light reflected by the reflective member 27. With the light-receiving unit 25, the greater an intensity of the received light, the greater a voltage value of an output signal output to a distance calculation unit 31 of the signal processing unit 30.

Because the laser light from the MEMS mirror 23 is reflected and scattered at the object 40, an intensity of the second reflected light that returns into the laser range finder 10 becomes extremely small compared to that of the laser light. As a result, an amp may be provided at a subsequent stage of the light-receiving unit 25 and a previous stage of the signal processing unit 30, and the output signal of the light-receiving unit 25 may be amplified.

(1-4. Reflective Member)

The reflective member 27 is a member having a reflective surface 28 where a distance of an optical path from the laser diode 21 to a position to which the laser light is irradiated according to the direction in which the laser light is output—according to one or more embodiments of the example, a distance from the MEMS mirror 23—changes. The reflective surface 28 reflects the laser light output from the laser diode 21. As illustrated in FIG. 5, the reflective member 27 is disposed to be near the opening portion in the casing 11 and so the reflective surface 28 is positioned in the scanning range of the laser light by the MEMS mirror 23. The reflective member 27 may be disposed in the scanning range of the laser light excepting an opening portion of the casing 11. The reflective surface 28 may be, for example, formed by being painted with a paint of a white color or the like. A distance from the laser diode 21 to one short side of the reflective surface 28 of the reflective member 27 may be shorter than a distance from the laser diode 21 to the other short side of the reflective surface 28.

Figure 7:
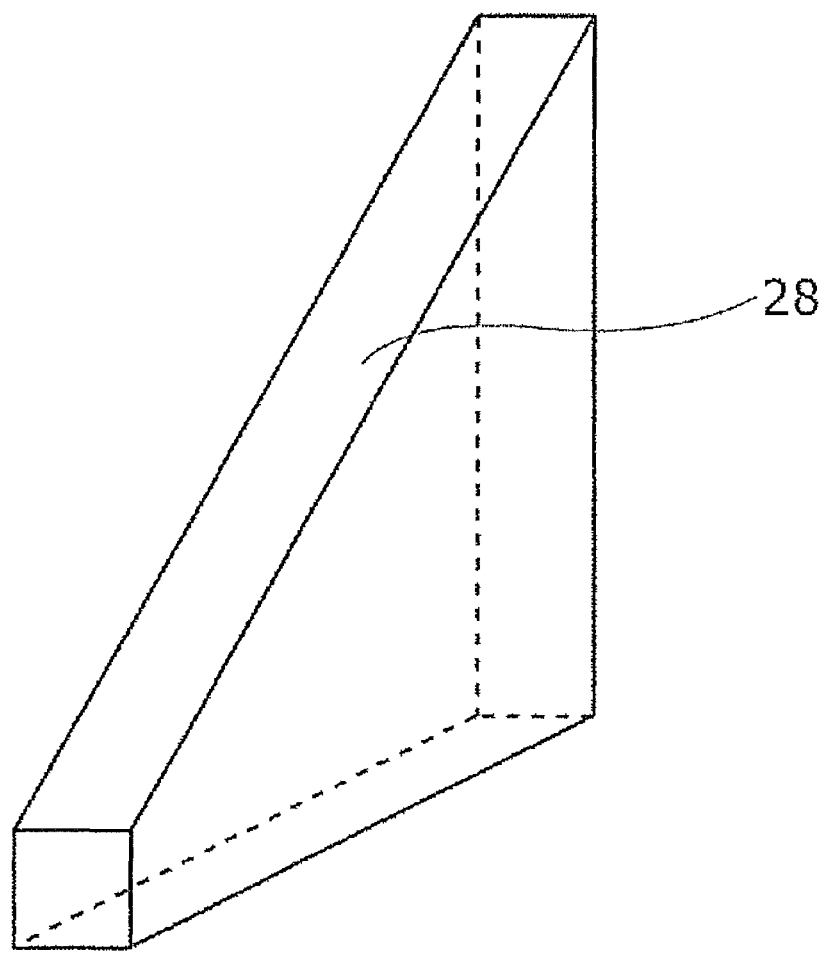
FIG. 7 shows a view illustrating a configuration of a reflective member according to one or more embodiments of an example of the present invention.

FIG. 7 is a view illustrating an example of a configuration of the reflective member 27 according to one or more embodiments of the example. As illustrated in FIG. 7, the reflective member 27 is configured by a member of a hexahedral shape, and according to one or more embodiments, an upper surface is the reflective surface 28. The reflective surface 28 is a rectangular plane. With the reflective member 27 according to one or more embodiment, shapes of two lateral surfaces that do not intersect the axis A1 (see FIG. 3) from among the four lateral surfaces are formed to be trapezoidal. That is, a surface adjacent to a long side of the reflective surface 28 is trapezoidal. The so-called upper side and lower side of this trapezoid are made to be parallel to the y-axis direction. That is, the upper surface (reflective surface 28) of the reflective member 27 contacts a lateral side of the trapezoid and is inclined relative to the y-axis direction.

Figure 11:
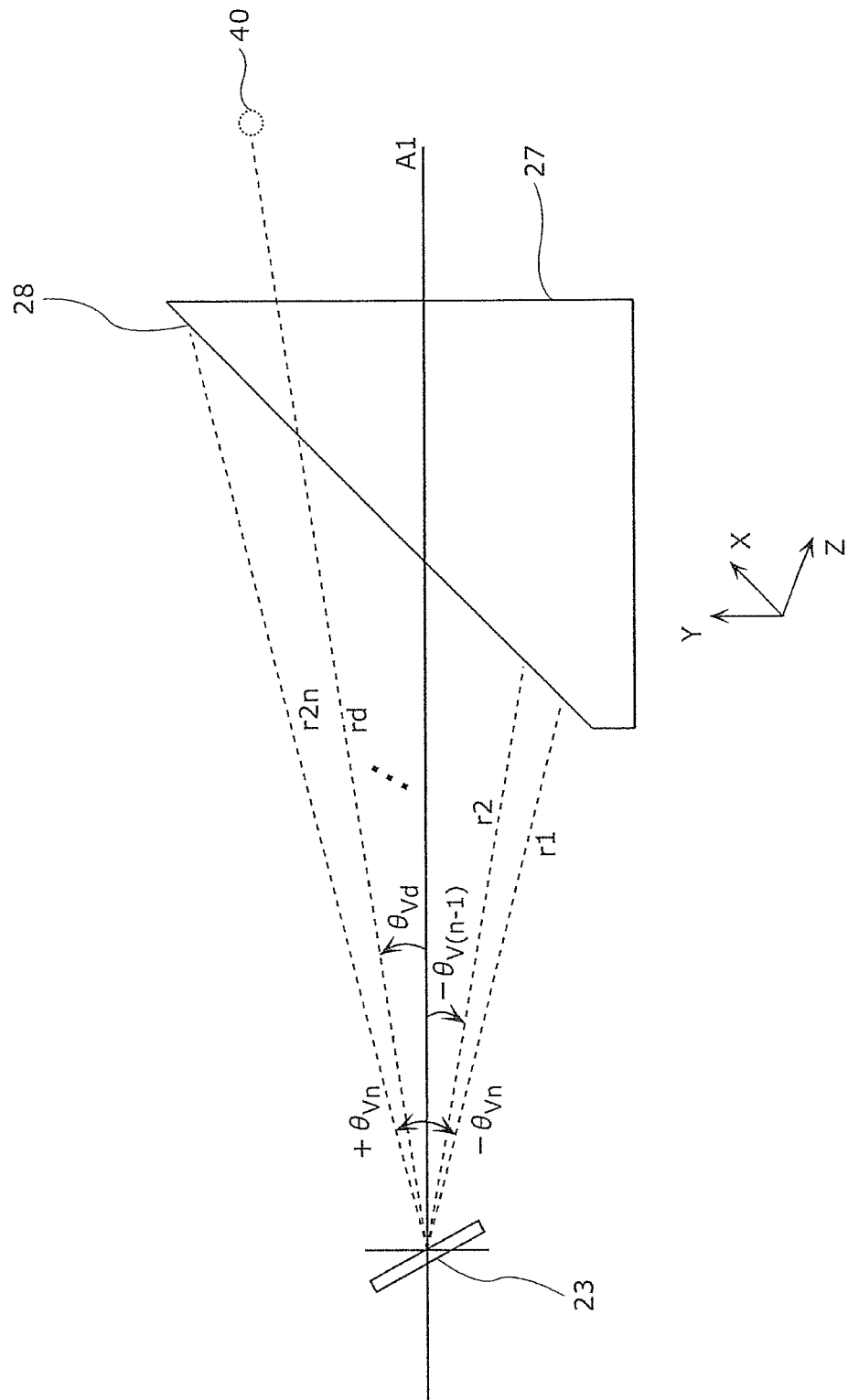
FIG. 11 shows a view illustrating a relationship between an angle of the laser light in a y-axis direction relative to an axis A1 and a distance between the MEMS mirror and a reflective surface according to one or more embodiments of an example of the present invention.

FIG. 11 is a view illustrating a relationship between an angle of the laser light in the y-axis direction relative to the axis A1 and a distance between the MEMS mirror 23 and the reflective surface according to one or more embodiments of the example. The axis A1 is the same as the axis AZ illustrated in FIG. 3. Specifically, the axis A1 is an axis that is parallel to the xz-plane and intersects the xy-plane and is an axis that passes through the MEMS mirror 23 and the reflective member 27.

As illustrated in FIGS. 5 and 11, the angle of the laser light in the y-axis direction changes between $+\theta_{V_n}$ to $-\theta_{V_n}$ due to the MEMS mirror 23. Each distance r1 to r2n between the MEMS mirror 23 and the reflective surface corresponds to each angle $-\theta_{V_n}$ to $+\theta_{V_n}$ of the laser light in the y-axis direction. As evident from FIG. 11, with the distances r1 to r2n, the greater the angle of the laser light in the y-axis direction, the greater the distance.

The reflective member 27 is disposed so a long side is substantially parallel to the axis A1. As illustrated in FIG. 3, the reflective member 27 is disposed more on an inner side than a line A2 that connects the MEMS mirror 23 and the opening portion of the casing 11. That is, for example, the reflective member 27 may be formed to cause a scanning time in which the reflective surface 28 is scanned with the laser light in a predetermined scanning direction to be constant.

(1-5. Signal Processing Unit)

As illustrated in FIG. 2, the signal processing unit 30 comprises the distance calculator unit 31, a reflective member detection unit 32, a first angle calculation unit 33, a minimum value detection unit 34, a maximum value detection unit 35, the subtraction unit 36, and the second angle calculation unit 37. The signal processing unit 30 may use a system LSI (Large Scale Integration) or an IC (Integrated Circuit). Alternatively, the signal processing unit 30 may be configured by a microcontroller. A distance calculated by the signal processing unit 30 is, for example, not a linear distance from the laser diode 21 to the object 40 or to the reflective member 27 but a length of an optical path.

The distance calculation unit 31 calculates the distance from the laser diode 21 to the object 40 and the distance from the laser diode 21 to the reflective member 27.

For example, the distance calculation unit 31 calculates a first distance from the laser diode 21 to the reflective member 27 using the first reflected light received by the light-receiving unit 25 and a second distance from the laser diode 21 to the object 40 using the second reflected light received by the light-receiving unit 25. A calculation method of the first distance and a calculation method of the second distance are the same.

To calculate the distance from the laser diode 21 to the object 40, for example, a time from when the laser light is output from the laser diode 21 to when the first reflected light is received by the light-receiving unit 25 is calculated based on a phase difference between a phase of the laser light output from the laser diode 21 and the first reflected light received by the light-receiving unit 25. The calculated time is a time it takes for the laser light to travel from the laser diode 21 to the object 40 and back. By multiplying the speed of light to a half of this time, the distance can be calculated. Similarly, the distance from the laser diode 21 to the reflective member 27 is calculated based on a phase difference between the phase of the laser light output from the laser diode 21 and the second reflected light received by the light-receiving unit 25.

Furthermore, calculation of the distance by the distance calculation unit 31 is performed by a timing of a control clock (timing of a count of a counter). A count value of the counter corresponds to time.

The reflective member detection unit 32 determines whether the distance calculated by the distance calculation unit 31 is the distance to the object 40 or the distance to the reflective member 27. The reflective member detection unit 32, in a situation where the distance is greater than a threshold Thr, determines the distance to be the distance to the object 40 and outputs this distance to the outside. The reflective member detection unit 32, in a situation where the distance is the threshold Thr or less, determines the distance to be the distance to the reflective member 27 and outputs this distance to the first angle calculation unit 33. The threshold Thr is, for example, a distance from the laser diode 21 to the opening portion of the casing 11. The threshold Thr is set to a value greater than a distance between the laser diode 21 and the reflective surface 28 of the reflective member 27 and smaller than a distance from the laser diode 21 to a surface on an outer side of the object lens 12.

The first angle calculation unit 33 acquires the distance between the MEMS minor 23 and the reflective surface 28 from the reflective member detection unit 32 and uses this distance to calculate (determines) the direction in which the laser light is output. According to one or more embodiments of the example, the first angle calculation unit 33 calculates the angle $\theta_{V_d}$ in the y-axis direction of when the object 40 is detected. The first angle calculation unit 33 includes a storage unit that stores a relational expression between the distance and the angle in the y-axis direction of when the object 40 is detected. Instead of a relational expression, a table or the like indicating a relationship between the distance and the angle in the y-axis direction of when the object 40 is detected may be stored.

The minimum value detection unit 34 detects a minimum value (local minimum value) $\theta_{V_{min}}$ from a calculation result of the angle in the y-axis direction in the first angle calculation unit 33. The maximum value detection unit 35 detects a maximum value (local maximum value) $\theta V_{max}$ from the calculation result of the angle in the y-axis direction in the first angle calculation unit 33. The subtraction unit 36 subtracts the minimum value $\theta_{V_{min}}$ detected in the minimum value detection unit 34 from the maximum value $\theta_{V_{max}}$ detected in the maximum value detection unit 35 and outputs this result to the rocker drive unit 24a of the minor drive unit 24.

The second angle calculation unit 37 calculates the angle in the x-axis direction of when the object 40 is detected using a timing of the light received by the light-receiving unit 25.

(2. Operations of Signal Processing Unit)

Operations of the signal processing unit 30 will be described using FIGS. 12 to 17.

Figure 12:
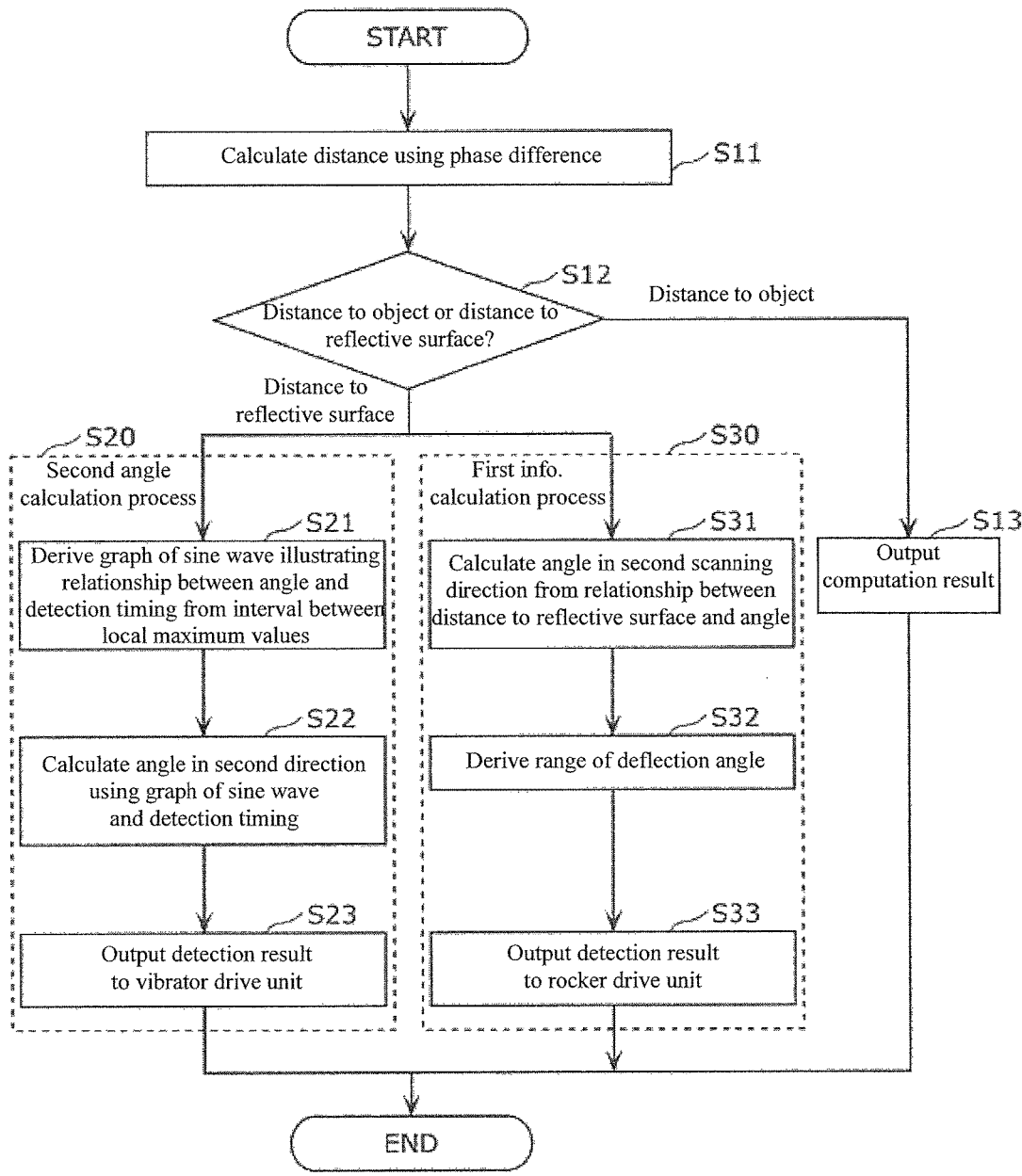
FIG. 12 shows a flowchart illustrating of a processing procedure of a signal processing unit according to one or more embodiments of an example of the present invention.

FIG. 12 is a flowchart illustrating an example of a processing procedure of the signal processing unit 30 according to one or more embodiments of the example. In one or more embodiments of the example, the signal processing unit 30 executes a distance measurement process that measures a distance from the opening portion to the object 40, a second angle calculation process that detects the angle of the object 40 to be detected in the x-axis direction, and a first angle calculation process that detects the angle of the object 40 to be detected in the y-axis direction.

(2-1. Distance Measurement Process)

As described above, the distance calculation unit 31 calculates the second distance, from the laser diode 21 to the object 40, or the first distance, from the laser diode 21 to the reflective member 27 (S11).

Figure 13:
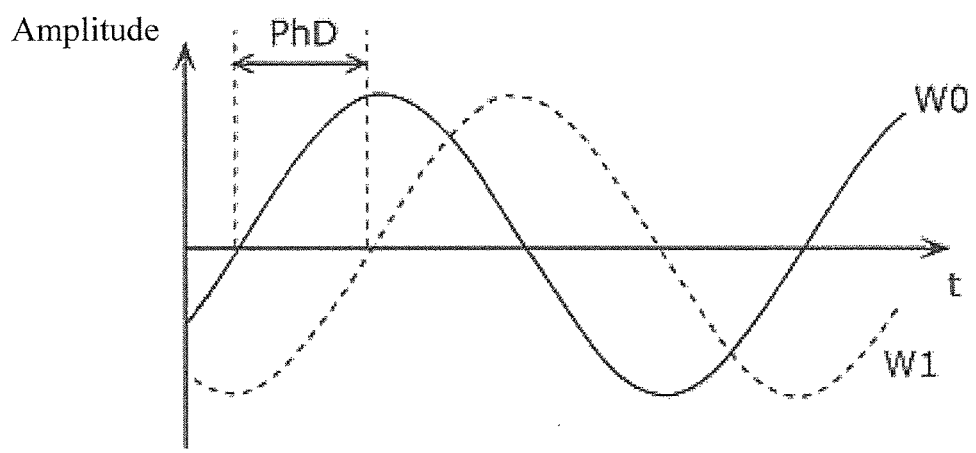
FIG. 13 shows a waveform diagram illustrating a waveform of the laser light and an example of a waveform of a light received by a light-receiving unit according to one or more embodiments of an example of the present invention.

FIG. 13 is a waveform diagram illustrating an example of a waveform W0 of the laser light and an example of a waveform W1 of the light received by the light-receiving unit 25 according to one or more embodiments of the example. As illustrated in FIG. 12, there is a phase difference PhD between the waveform W0 and the waveform W1. In one or more embodiments of the example, the distance calculation unit 31 calculates the distance from the phase difference PhD×the speed of light. In one or more embodiments, because a temporally continuous laser light is output, the distance is calculated using the phase difference, but one or more embodiments of the present invention is not limited thereto. For example, the laser light may be flashed, and a difference between starting, when the laser light is lighted, and a time when the laser light is received may be used as a time difference.

From the phase difference PhD in a period when the first reflected light reflected by the reflective member 27 is being received, the first distance between the laser diode 21 and the reflective surface 28 is calculated. Moreover, from the phase difference PhD in a period when the second reflected light reflected by the object 40 is being received, the second distance from the laser diode 21 to the object 40 is calculated. However, the first distance or the second distance is calculated by the same algorithm, and it is not distinguished whether a computation result is the first distance or the second distance.

Figure 14:
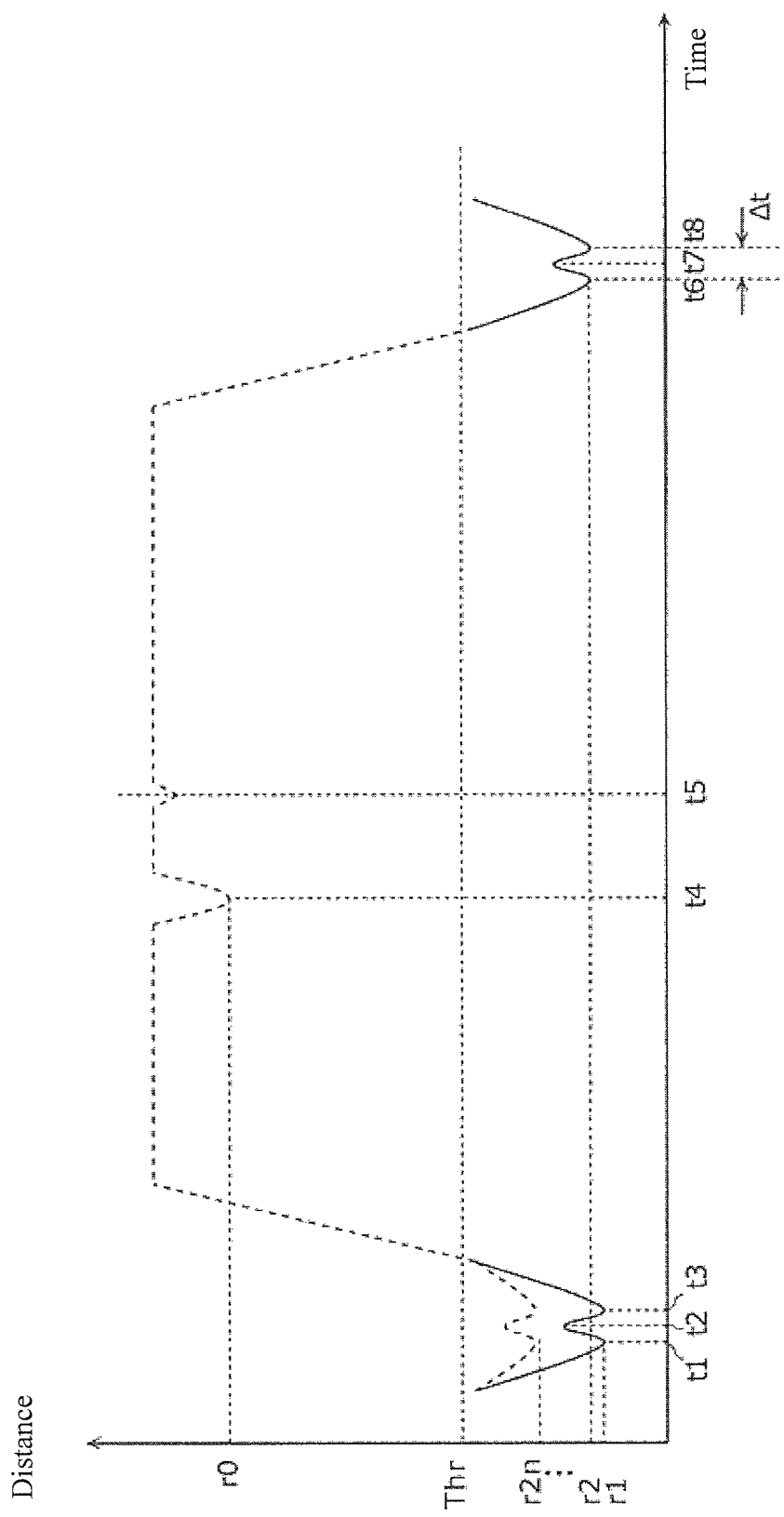
FIG. 14 shows a graph illustrating a calculation result of a distance according to one or more embodiments of an example of the present invention.

FIG. 14 is a graph illustrating an example of a calculation result of the distance according to one or more embodiments of the example. In one or more embodiments of the example, a timing at which the distance becomes the local minimum value becomes a timing of seeking the first distance or the second distance. In FIG. 14, times t1 to t3, times t6 to t8, . . . , times t(1+5n) to t(3+5n) are times when the first reflected light from the reflective surface 28 is being received. Therefore, a calculation result r1 of the distance at the times t1 and t3, a calculation result r2 of the distance at the times t6 and t8, . . . , a calculation result r2n of the distance at the times t(1+5n) and t(3+5n) (the dotted-line portion in FIG. 14) become a calculation result of the distance to the reflective member 27. Moreover, in FIG. 14, before and after the time t4 are times when the second reflected light from the object 40 is being received, and a calculation result r0 of the distance at the time t4 becomes the calculation result of the distance to the object 40. In FIG. 14, the time t5 is a point when the laser light folds back in the x-axis direction.

The reflective member detection unit 32 determines whether the calculated distance is the distance to the object 40 or the distance to the reflective member 27 (S12).

In one or more embodiments of the example, the reflective member detection unit 32, in a situation where the calculated distance is greater than the threshold Thr, determines the calculated distance to be the distance to the object 40 and, in a situation where the calculated distance is the threshold Thr or less, determines the calculated distance to be the distance to the reflective surface 28. As described above, the threshold Thr is, for example, the distance from the laser diode 21 to the opening portion of the casing 11.

The reflective member detection unit 32, in the situation where the calculated distance is determined to be the distance to the object 40 (distance to the object 40 of S12), outputs the calculation result to the outside (S13). Moreover, the reflective member detection unit 32 outputs a time when the object 40 is detected to the second angle calculation unit 37 and the first angle calculation unit 33.

For example, in the situation of FIG. 14, because the distance r0 of the time t4 is greater than the threshold Thr, it is determined to be the distance to the object 40. The reflective member detection unit 32 outputs the time t4 when the object 40 is detected to the second angle calculation unit 37 and the first angle calculation unit 33.

The reflective member detection unit 32, in the situation where the calculated distance is determined to be the distance to the reflective surface 28 (distance to the reflective surface of S12), outputs the calculation result of the distance and a time when this distance is measured to the second angle calculation unit 37 and the first angle calculation unit 33.

For example, in the situation of FIG. 14, because the distance r1 of the times t1 and t3, the distance r2 of the times t6 and t8, . . . , the distance r2n of the times t(1+5n) and t(3+5n) (see the dotted-line portion in FIG. 14) are smaller than the threshold Thr, these are determined to be the distance to the reflective surface 28. The reflective member detection unit 32 outputs to the second angle calculation unit 37 and the first angle calculation unit 33 the times t1 and t3, the times t6 and t8, . . . , the times t(1+5n) and t(3+5n) detected by the reflective surface 28, and the calculation results r1 to r2n of the distances at each time.

The distance r1 of the times t1 and t3 is a distance where the first distance from the MEMS minor 23 to the reflective member 27 becomes the smallest. The distance r2n of the times t(1+5n) and t(3+5n) is a distance where the first distance from the MEMS mirror 23 to the reflective member 27 becomes the greatest.

(2-2. Second Angle Calculation Process (Angle of X-Axis Direction))

The second angle calculation unit 37, when the calculation result of the distance is output from the reflective member detection unit 32, executes the second angle calculation process, which calculates the angle in the x-axis direction of when the object 40 is detected (S20).

Because the laser light folds back in the x-axis direction straddling the reflective surface 28, as illustrated in FIG. 14, in the graph of the calculation result of the distance, sets of local minimum values configured from two local minimum values of the same value appear in succession when the laser light straddles the reflected surface 28. This set of local minimum values repeatedly appears each time the laser light straddles the reflective surface 28. In one or more embodiments of the example, the angle in the x-axis direction is calculated using the set of local minimum values of immediately after the object 40 is detected, but one or more embodiments of the present invention is not limited thereto. For example, the angle in the x-axis direction may be calculated from each of the two sets of minimum values before and after the object 40 is detected, and an average value thereof may be calculated as the angle in the x-axis direction of when the object 40 is detected. Alternatively, the angle in the x-axis direction may be calculated using the two local minimum values appearing at a time closer to the time when the object 40 is detected.

The second angle calculation unit 37 seeks a timing at which the light-receiving unit 25 receives the first reflected light from the calculation result of the distance illustrated in FIG. 14 and derives a graph of a sine wave illustrating a relationship between the angle and the detection timing (S21).

The second angle calculation unit 37 seeks an interval Δt between times when the two local minimum values appear from the calculation result of the distance illustrated in FIG. 14. For example, Δt=t(3+5n)−t(1+5n). The second angle calculation unit 37 calculates the sine wave from the interval Δt and an angle $\theta_H$ (see FIG. 3) in the x-axis direction relative to the axis AZ the reflective member 27.

From these conditions, the second angle calculation unit 37 seeks the graph of the sine wave illustrating the relationship between angle and time. For example, the second angle calculation unit 37 seeks a sine wave where an interval of an intersection with a straight line of an angle $\theta_O$ (length of a portion including the local minimum value) becomes the interval Δt.

A derivation method of the sine wave will be described below for, for the sake of description, as illustrated in FIG. 6, two scanning ranges, a scanning range R1 (solid-line portion) and a scanning range R2 (dashed-line portion), where deflection widths of the laser light in the x-axis direction are different. An interval between the two local minimum values in a situation of the scanning range R1 is defined as Δt1, and an interval between the two local minimum values in a situation of the scanning range R2 will be defined as Δt2. As shown in FIG. 14, for the sake of description, a calculation result of the distance in the situation of the scanning range R1 is illustrated. In the situation of the scanning range R2, it is thought that a timing at which the local maximum values appear becomes close to t2. That is, in the situation of the scanning range R2, it is thought that a first local maximum value appears at a timing closer to t2 than t1 and a second local maximum value appears at a timing closer to t2 than t3.

Figure 15:
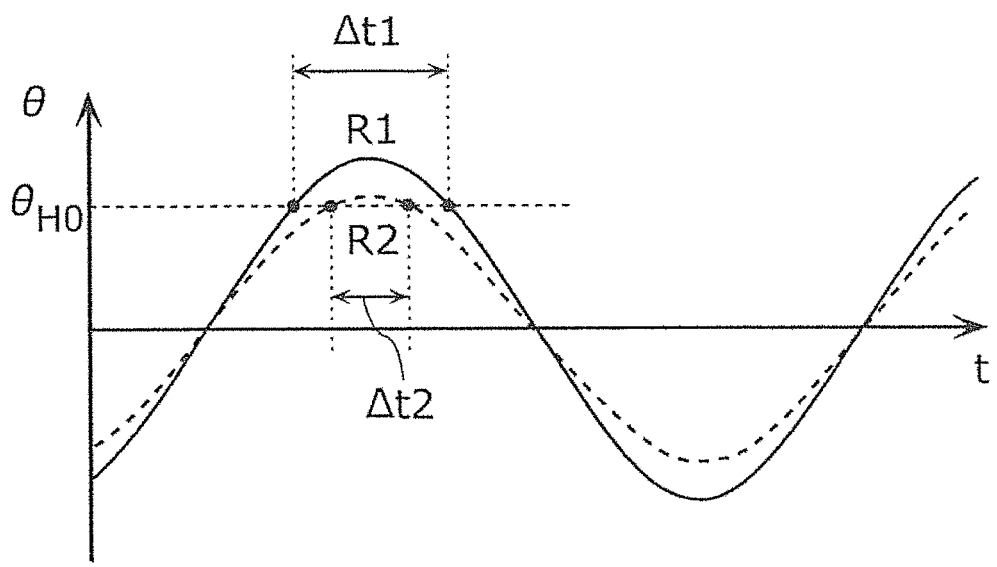
FIG. 15 shows a graph illustrating a sine wave illustrating a relationship between an angle and a detection timing according to one or more embodiments of an example of the present invention.

FIG. 15 is a graph illustrating an example of sine waves illustrating a relationship between the angle and the detection timing according to one or more embodiments of the example. In FIG. 15, sine waves corresponding to the scanning ranges R1 and R2 in FIG. 6 are illustrated.

As illustrated in FIG. 12, the second angle calculation unit 37 uses the graph of the sine wave sought at step S21 to calculate the angle in the x-axis direction of when the object 40 is detected (S22).

Figure 16:
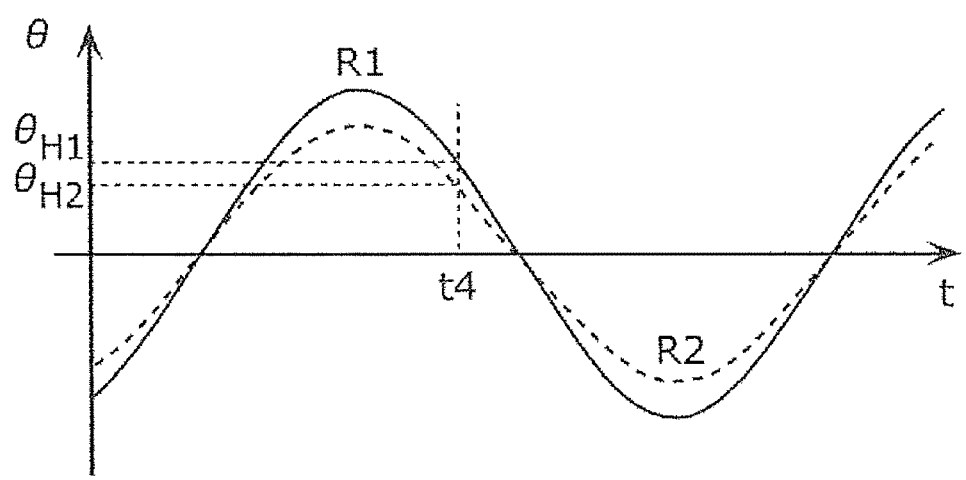
FIG. 16 shows a graph illustrating a derivation method of an angle of an object according to one or more embodiments of an example of the present invention.

FIG. 16 is a graph illustrating an example of a derivation method of the angle of the object 40 in the x-axis direction according to one or more embodiments of the example. The second angle calculation unit 37 seeks the angle of when the object 40 is detected from an intersection between the time t4 when the object 40 is detected (see FIG. 14) and the sine wave. In the scanning ranges R1 and R2 in FIG. 3, in a situation where the detection timings are the same, at t4, in the situation of the scanning range R1, it is derived that the angle is $\theta_{H1}$, and in the situation of the scanning range R2, it is derived that the angle is $\theta_{H2}$.

Figure 17:
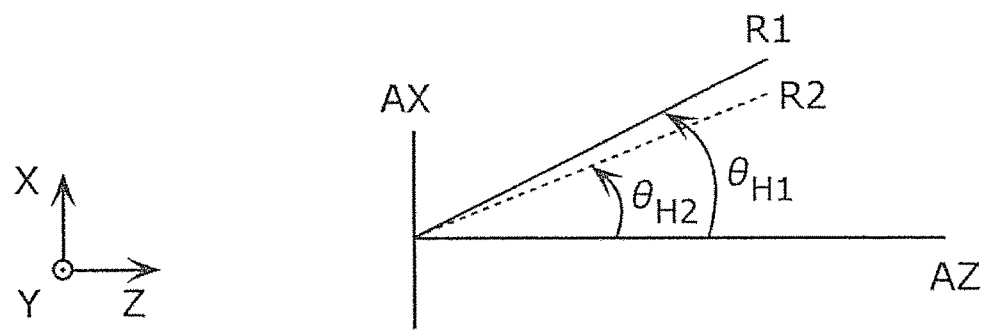
FIG. 17 shows a diagram illustrating a derivation result of the angle of the object according to one or more embodiments of an example of the present invention.

FIG. 17 is a diagram illustrating a derivation result of the angle of the object 40 according to one or more embodiments of the example of the present invention.

The second angle calculation unit 37 sends the calculation result of the angle ($\theta_{H1}$ or $\theta_{H2}$) as feedback to the vibrator drive unit 24b of the minor drive unit 24 (S23). The vibrator drive unit 24b adjusts a horizontal drive signal output to the MEMS mirror 23 according to a feedback result so a scanning angle of the laser light in the x-axis direction, that is, a change amount per unit time of the angle of the laser light in the x-axis direction becomes constant.

By configuring in this manner, even in a situation where the deflection width of the laser light in the x-axis direction changes, it may be possible to accurately seek the angle in the x-axis direction of when the object 40 is detected. Moreover, it becomes possible to perform adjustment of the deflection width of the laser light in the x-axis direction.

(2-3. First Angle Calculation Process)

The first angle calculation unit 33, the minimum value detection unit 34, the maximum value detection unit 35, and the subtraction unit 36 execute the first angle calculation process that calculates the angle of the laser light in the y-axis direction of when the object 40 is detected and a deflection width of the laser light in the y-axis direction (S30).

The first angle calculation unit 33 calculates the angle of when the object 40 is detected from a relationship stored in advance between the distance to the reflective surface 28 and the angle (S31). The first angle calculation unit 33, in a state where the angle in the y-axis direction of when the object 40 is detected is maintained, uses the first reflected light of when the laser light straddles the reflective surface 28 to calculate the distance from the laser diode 21 to the reflective surface 28. Moreover, the first angle calculation unit 33 uses the calculated distance to seek an angle of the first reflected light in the y-axis direction from the relationship stored in advance between the distance to the reflective surface 28 and the angle. As described above, the angle of the first reflected light in the y-axis direction and the angle in the y-axis direction of when the object 40 is detected are the same. Therefore, by seeking the angle of the first reflected light in the y-axis direction, the angle in a y-direction of when the object 40 is detected can be calculated.

The minimum value detection unit 34, the maximum value detection unit 35, and the subtraction unit 36 derive a range of a deflection angle of the laser light in the y-axis direction (S32). Calculation of the deflection angle is performed at each two-dimensional scanning Specifically, first, by the minimum value detection unit 34, a minimum value is detected from the calculation result of the angle in the y-axis direction in the first angle calculation unit 33. Similarly, by the maximum value detection unit 35, a maximum value (local maximum value) is detected from the calculation result of the angle in the y-axis direction in the first angle calculation unit 33.

Furthermore, by the subtraction unit 36, the minimum value detected in the minimum value detection unit 34 is subtracted from the maximum value detected in the maximum value detection unit 35. A computation result of the subtraction unit 36 becomes the deflection width of the laser light in the y-axis direction.

The subtraction unit 36 sends the calculation result of the deflection width of the laser light in the y-axis direction as feedback to the rocker drive unit 24a of the mirror drive unit 24 (S33). The rocker drive unit 24a adjusts a vertical drive signal output to the MEMS mirror 23 according to a feedback result so a scanning angle of the laser light in the y-axis direction, that is, a change amount per unit time of an angle of the laser light in the y-axis direction becomes constant.

By configuring in this manner, even in a situation where the deflection width of the laser light in the y-axis direction changes, it may be possible to accurately seek the angle in the x-axis direction of when the object 40 is detected. Moreover, it may be possible to perform adjustment of the deflection width of the laser light in the y-axis direction.

(3. Effects)

The laser range finder 10 according to one or more embodiments of the example comprises the reflective member 27 having the reflective surface 28 where the distance from the laser diode 21 to the reflective surface 28 changes according to the angle of the laser light in the y-axis direction; therefore, it may be possible to seek the direction in which the laser light is output (angle in the y-axis direction) by seeking the distance from the laser diode 21 to the reflective member 27.

The laser range finder 10 according to one or more embodiments of the example comprises the relational expression or table that indicates the relationship between the distance from the MEMS minor 23 to the reflective surface 28 and the angle in the y-axis direction; therefore, the direction in which the laser light is output (angle in the y-axis direction) can be sought by a simple method.

The laser light is changed in the x-axis direction in the state where the angle in the y-axis direction is maintained; therefore, by using the first reflected light of the laser light that straddles the reflective member 27 in the state where the angle in the y-axis direction of when the object 40 is detected is maintained, the angle in the y-axis direction of when the object 40 is detected can be sought.

Furthermore, it becomes possible to seek the angle in the x-axis direction from the timing at which the first reflected light reflected by the reflective member 27 is received by the light-receiving unit 25.

The laser range finder 10 according to one or more embodiments of the example can use a conventional configuration for configurations other than that of the reflective member 27, and the reflective member 27 can be provided comparatively inexpensively. Therefore, manufacturing costs can be suppressed from increasing.

(4. Modified Example)

One or more embodiments of a modified example will be described using FIGS. 8 to 10.

In one or more embodiments of the modified example, a situation will be described where a shape of the reflective member 27 is different from that of the above one or more embodiment of the example.

Figure 8:
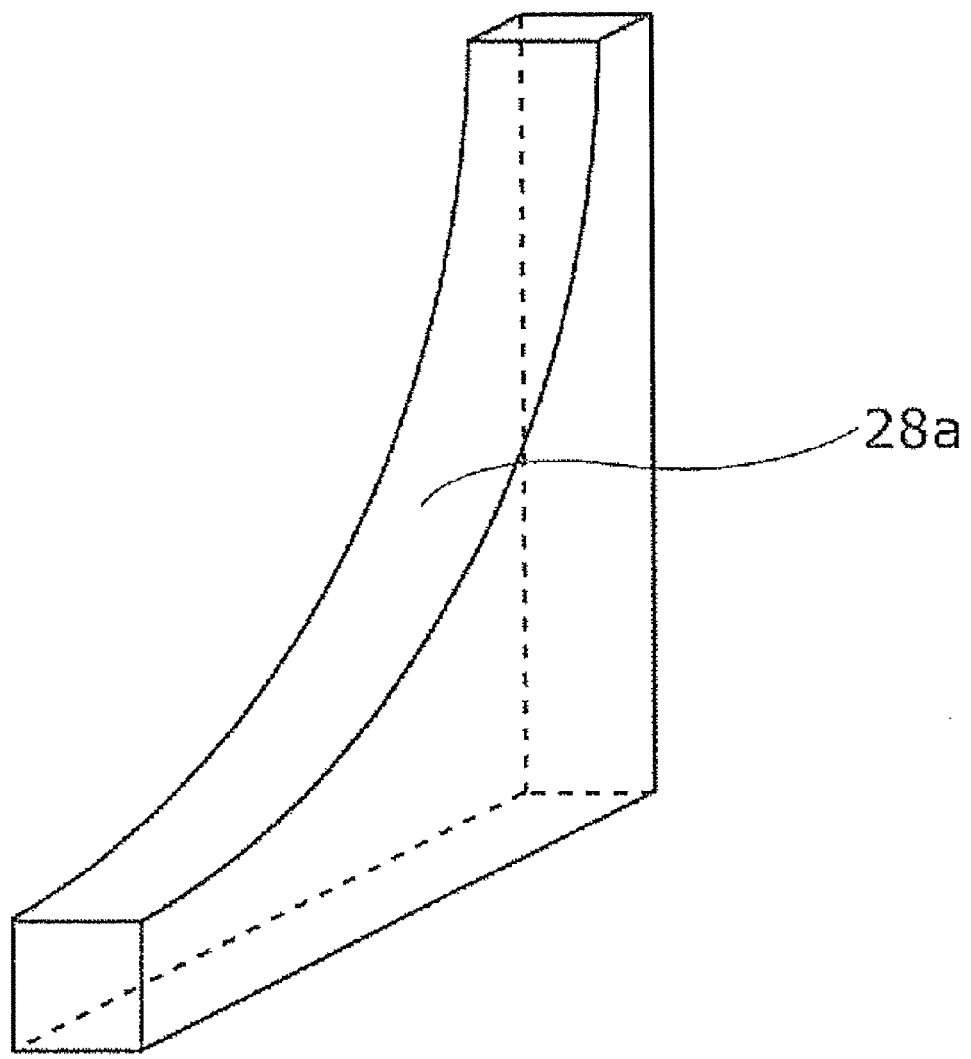
FIG. 8 shows a view illustrating a configuration of a reflective member according to one or more embodiments of a modified example of the present invention.
Figure 9:
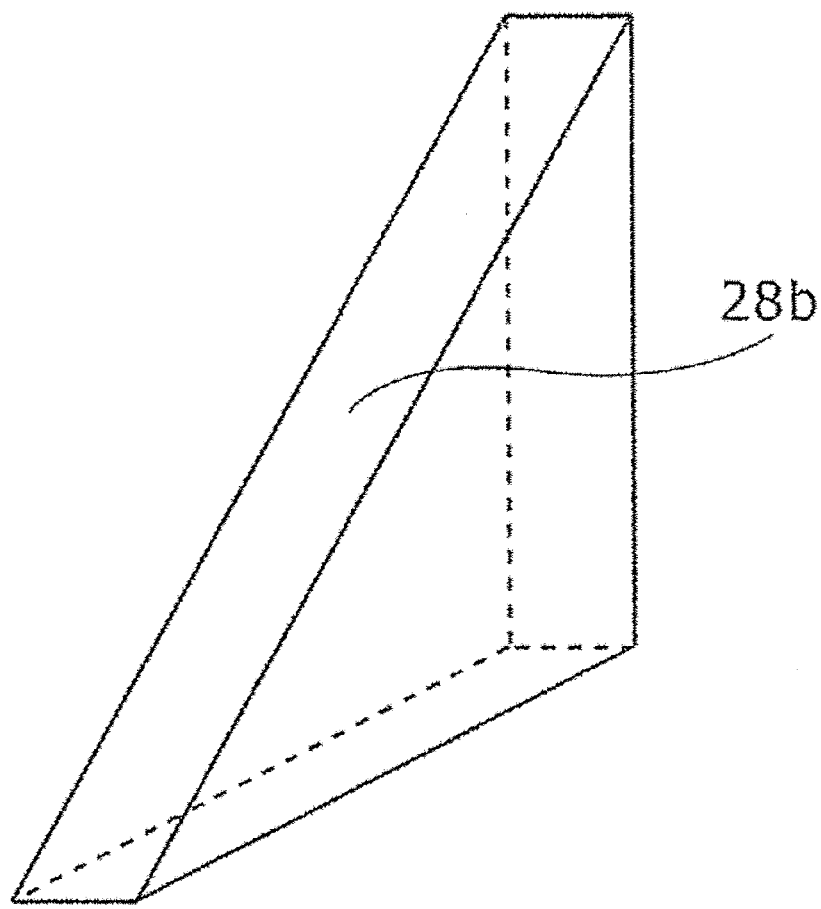
FIG. 9 shows a view illustrating a configuration of a reflective member according to one or more embodiments of a modified example of the present invention.

FIGS. 8 to 10 are views illustrating examples of shapes of reflective members 27A to 27C according to one or more embodiments of the modified example.

The reflective member 27A illustrated in FIG. 8 is of a shape where a reflective surface 28a curves. The reflective surface 28a is a rectangular curved surface. In the reflective member 27B illustrated in FIG. 9, shapes of a set of lateral surfaces are triangles. That is, the reflective member 27B is a triangular prism, and one side surface of the triangular prism is the reflective surface 28b. A shape of a reflective surface 28b in FIG. 9 is the same as the reflective surface 28 illustrated in FIG. 7.

Figure 10A:
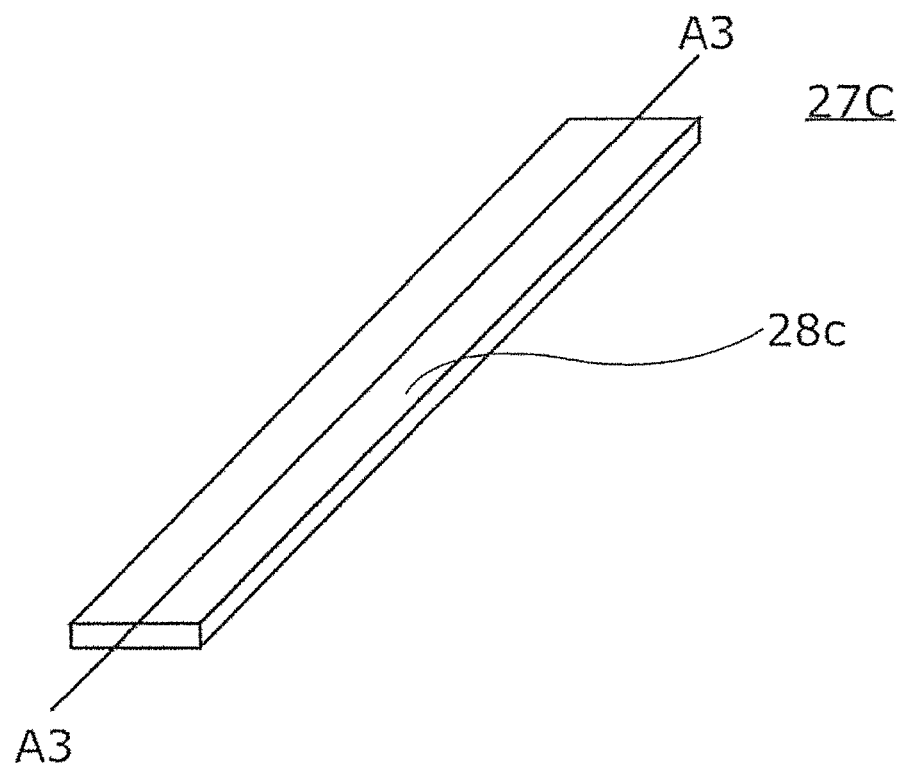
FIG. 10A shows a view illustrating a configuration of a reflective member according to one or more embodiments of a modified example of the present invention.
Figure 10B:
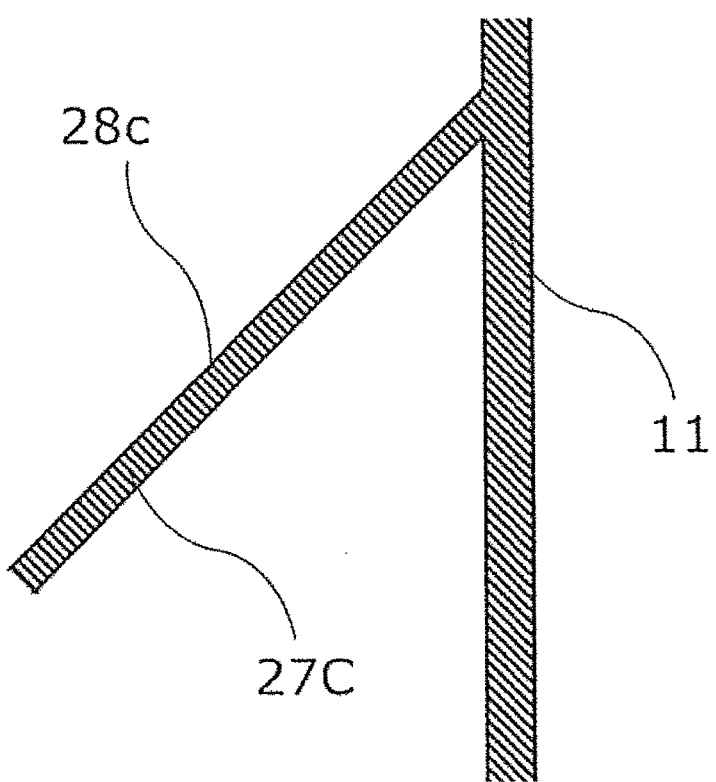
FIG. 10B shows a view illustrating a configuration of a reflective member according to one or more embodiments of a modified example of the present invention.

The reflective member 27 illustrated in FIG. 10 is configured by a plate-like member. A shape of a reflective surface 28c in FIG. 10 is the same as that of the reflective surface 28 illustrated in FIG. 7. FIG. 10B illustrates a cross-sectional view at A3 in FIG. 10A. As illustrated in FIG. 10B, with the reflective member 27C, the reflective surface 28c is installed inclined relative to the y-axis direction so the distance from the MEMS mirror 23 changes according to the angle of the laser light in the y-axis direction.

With any of FIGS. 8 to 10, because the distance from the MEMS minor 23 changes according to the angle of the laser light in the y-axis direction, it becomes possible to accurately seek the angle in the y-axis direction.

Another Example

The laser range finder according to one or more embodiments of the present invention is described above, but the present invention is not limited to those embodiments.

According to one or more embodiments, for example, the MEMS mirror 23 (scanning unit) may be a perforated mirror.

The present invention may be applied, instead of a monocular laser range finder, as a laser range finder where a lens through which the laser light output to the object 40 and a lens that receives the reflected light from the object 40 are configured separately.

Furthermore, the above one or more embodiments of the example and the above one or more embodiments of another example may be combined.

The above one or more embodiments of the example is applicable to a laser range finder that detects a distance of an object.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES 10 laser range finder; 11 casing; 12 object lens; 20 modulated signal output unit; 21 laser diode; 22 perforated mirror; 23 MEMS mirror; 23a mirror portion; 23b mirror rocker; 24 mirror drive unit; 24a rocker drive unit; 24b vibrator drive unit; 25 light-receiving unit; 27, 27A, 27B, 27C reflective member; 28, 28a, 28b, 28c reflective surface; 30 signal processing unit; 31 distance calculation unit; 32 reflective member detection unit; 33 first angle calculation unit; 34 minimum value detection unit; 35 maximum value detection unit; 36 subtraction unit; 37 second angle calculation unit; 40 object; R1, R2 scanning range; W0, W1 waveform

What is claimed is:

1. An electronic apparatus, comprising:
a light source that outputs a laser light;
a scanning unit that scans the laser light;
a reflective member comprising a reflective surface that reflects the laser light;
a light-receiving unit that receives a first reflected light reflected by the reflective member; and
a signal processing unit that calculates a distance from the light source to the reflective surface using the first reflected light and determines, based on the distance, a direction in which the laser light is output.

2. The electronic apparatus according to claim 1, wherein the reflective member is formed to cause a scanning time in which the reflective surface is scanned with the laser light in a predetermined scanning direction to be constant.

3. The distance measurement device according to claim 1, wherein the reflective surface is a rectangular plane.

4. The electronic apparatus according to claim 1, wherein the reflective surface is a rectangular curved surface.

5. The electronic apparatus according to claim 1, wherein white paint is painted on the reflective surface.

6. The electronic apparatus according to claim 1, wherein a distance from the scanning unit to one short side of the reflective surface of the reflective member is shorter than a distance from the scanning unit to the other short side of the reflective surface.

7. The electronic apparatus according to claim 1, wherein the reflective member is disposed within a scanning range of the laser light except an opening portion of a casing.

8. The electronic apparatus according to claim 1, wherein the scanning unit
- changes a direction in which the laser light is scanned to a first scanning direction and to a second scanning direction that intersects the first scanning direction, and
- by changing an angle in the second scanning direction after being scanned in the first scanning direction while the angle in the second scanning direction is maintained, changes the direction in which the laser light is scanned two-dimensionally.

9. The electronic apparatus according to claim 8, wherein the light-receiving unit further receives a second reflected light that is the laser light reflected by an object, and the signal processing unit
- calculates, while an angle in the second scanning direction of when the light-receiving unit receives the second reflected light is maintained, a distance from the light source to the reflective member using the first reflected light, and
- calculates an angle of the laser light in the first scanning direction of when the second reflected light is received using the calculated distance and an angle in the first scanning direction of when the first reflected light is received.

10. The electronic apparatus according to claim 1, wherein the signal processing unit calculates the distance based on a phase difference between a phase of the laser light and a phase of the light received by the light-receiving unit.

11. The electronic apparatus according to claim 1, wherein the signal processing unit calculates an angle in the first scanning direction of when an object reflecting a second reflected light is detected, based on a timing at which the light-receiving unit receives the first reflected light and a time when the object is detected.

12. The electronic apparatus according to claim 11, wherein the signal processing unit:
- acquires a timing at which the object is detected,
- detects an interval between the timing at which the light-receiving unit receives the first reflected light and a time when the laser light passes through the reflective member,
- calculates a sine wave indicating displacements in a direction of the laser light relative to time using the interval and a direction in which the reflective member is disposed, and
- calculates the direction of the laser light using the sine wave and the timing at which the object is detected.

13. The electronic apparatus according to claim 1, wherein
- the signal processing unit comprises a reflective member detection unit, and
- the reflective member detection unit determines, based on a threshold, whether a distance calculated by the signal processing unit is a distance from a laser diode to an object or a distance from the laser diode to the reflective member.

14. The electronic apparatus according to claim 1, wherein the threshold is a distance from the light source to an opening portion of a casing.

15. The electronic apparatus according to claim 1, wherein the scanning unit is a perforated mirror.

16. The electronic apparatus according to claim 3, wherein
- the reflective member is a hexahedral shape that includes the reflective surface and a surface adjacent to a long side of the reflective surface is trapezoidal.

17. The electronic apparatus according to claim 3, wherein
- the reflective member is a triangular prism, and
- the reflective surface is one side surface of the triangular prism.

18. The electronic apparatus according to claim 3, wherein
- the reflective member is a plate-like member that includes the reflective surface, and
- a distance from the scanning unit to one short side of the reflective surface of the reflective member is shorter than a distance from the scanning unit to the other short side of the reflective surface.

19. The electronic apparatus according to claim 3, wherein
- a distance from the scanning unit to one short side of the reflective surface of the reflective member is shorter than a distance from the scanning unit to the other short side of the reflective surface.

20. A method comprising:
- scanning a laser light output by a light source;
- reflecting, with a reflective surface of a reflective member, the laser light;
- calculating a distance from the light source to the reflective surface using the reflected light; and
- determining, based on the calculated distance, a direction in which the laser light is output.

* * * * *